United States Patent [19]

Ridgway et al.

[11] 4,218,365

[45] Aug. 19, 1980

[54] POLYAMIDE FIBERS HAVING IMPROVED OZONE FADING RESISTANCE

[75] Inventors: James S. Ridgway; Richard D. Chapman, both of Pensacola, Fla.; Kurt Moedritzer, Webster Groves, Mo.; Oscar A. Pickett, Jr., Pensacola, Fla.

[73] Assignee: Monsanto Company, St. Louis, Mo.

[21] Appl. No.: 965,633

[22] Filed: Dec. 1, 1978

[51] Int. Cl.² .............................. C08K 5/52; C08K 5/53
[52] U.S. Cl. .............................................. 260/45.75 C
[58] Field of Search ................... 260/45.75 C, 857 R; 528/395

[56] References Cited

U.S. PATENT DOCUMENTS

| | | | |
|---|---|---|---|
| 3,275,574 | 9/1966 | Saraceno | 260/2 |
| 3,538,136 | 11/1970 | Schmidt et al. | 260/448 |
| 3,654,189 | 4/1972 | Venezky | 260/33.6 R |
| 4,036,811 | 7/1977 | Noetzel et al. | 260/45.7 PT |
| 4,049,612 | 9/1977 | Sandler | 260/45.75 C |
| 4,078,016 | 3/1978 | Kramer | 260/45.7 PT |

FOREIGN PATENT DOCUMENTS 51-56850  5/1976  Japan.

*Primary Examiner*—V. P. Hoke
*Attorney, Agent, or Firm*—John W. Whisler

[57] ABSTRACT

Polyamide fibers containing one or more of a certain class of poly(copper phosphinates) have improved resistance to color fading when dyed with disperse dyes and exposed to ozone than do corresponding fibers from which the phosphinate has been omitted.

10 Claims, No Drawings

POLYAMIDE FIBERS HAVING IMPROVED OZONE FADING RESISTANCE

BACKGROUND OF THE INVENTION

A. Field of the Invention

This invention relates to polyamide fibers containing as an antiozonant one or more poly(copper phosphinates) of the formula

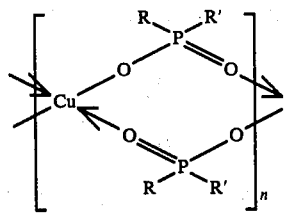

where R is —H, —CH$_3$, —CH$_2$CH$_3$, —CH$_2$CH$_2$CO$_2$H or

R' is

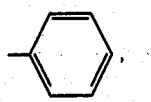

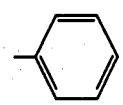

n is a whole number greater than one, with the proviso that R and R' may be joined to form the radical

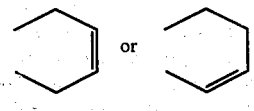

(i.e., in

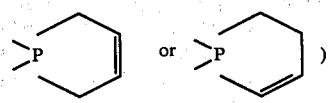

or

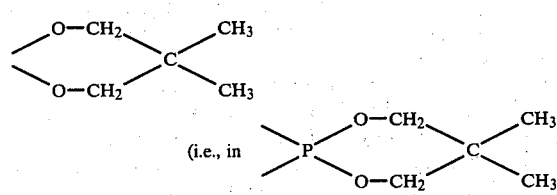

The term "polyCuP" when used hereinafter means a compound of the above formula. Fibers of the invention, when dyed with disperse dyes, have significantly improved resistance to ozone fading when compared to corresponding fibers dyed with disperse dyes from which the polyCuP has been omitted. The term "ozone fading", as used herein, means color fading of dyed fiber resulting from the dyed fiber being exposed to ozone. The term "fiber" as used herein means spun or continuous filament yarn, or a monofilament.

B. Description of the Prior Art

Polyamide fibers, especially those dyed with disperse dyes, exhibit considerable fading of color when exposed to ozone at high humidities, i.e. exhibit ozone fading. Such conditions are encountered along the Gulf Coastal regions and in areas of high atmospheric pollution. Ozone fading is more severe in open structured polyamides (e.g. nylon 6), wax-filled polyamides and copolyamides.

It has been suggested in the prior art to use certain tertiary amines as a coating material (U.S. Pat. No. 3,892,525) or certain organic phosphites as an additive (U.S. Pat. No. 3,844,713) for the purpose of reducing ozone fading of polyamide fibers. These techniques however have certain drawbacks, for example, the extra step required for the application of a coating material is usually inconvenient and costly. On the other hand, a relatively large amount of the organic phosphite additive is required to effectively reduce ozone fading in polyamides (i.e. 0.1 to 8%).

Poly (metal phosphinates) have been described in the chemical and patent literature. Pennsalt Chemical Corp. (now Pennwalt Corp.) Technical Data (i.e. bulletin) entitled "Metal Phosphinate Polymers" was published prior to the subject invention. In this bulletin certain zinc and chromium phosphinates are described as being useful as UV stabilizers for polyvinyl chloride and as antistatic coatings, alkali-resistant fibers and coatings, heat distortion improvers for epoxy resins, accelerators for epoxy resins, propellant modifiers and high-temperature coatings.

U.S. 3,275,574 relates to various poly (metal phosphinates), such as, where the metal is chromium, iron, ruthenium, europium and ytterbium. The particular phosphinates are described as having high-temperature stability and being useful as fabricated articles or coatings where high temperatures are encountered.

U.S. Pat. No. 3,538,136 relates to poly (aluminum phosphinates) which are described as being useful as surface coatings, heat shields, etc. in applications requiring heat stability at elevated temperatures.

U.S. Pat. No. 3,654,189 describes a method for producing poly (metal phosphinates) wherein a solution of a dihydrocarbon phosphinic acid in acetic anhydride is heated under reflux with a hydrous polyvalent metal nitrate (s). The nitrate may be a hydrated nitrate of a Group II-A, I-B, II-B, III-B, IV-B, V-B, VI-B, VII-B, VIII or a rare earth metal, such as cerium, of the periodic table. The phosphinates are disclosed as being useful as pigments in water-base latex or acrylic resin paints in amounts ranging from 15 to 40% as well as in a variety of other applications.

Japanese patent 49-130462 relates to flame-resistant molding resins containing from 0.1 to 40 wt. % and, preferably, 2 to 10 wt. % of a poly (metal phosphinate), where the metal may be Ca, Sr, Ba, Zn, B, Be, Cd, Hg, Co, Ni, Cu, Ag, Au, Pd, Cr, Mn, Ti, V, Fe, Co, Pd, Si, Sn, Rh, etc.

U.S. Pat. No. 4,049,612 relates to poly (metal phosphinates) as smoke-retardants for polyvinyl halide resin.

SUMMARY OF THE INVENTION

The present invention provides polyamide fibers containing, in an amount sufficient to reduce ozone fading, one of more poly(copper phosphinates) of the formula

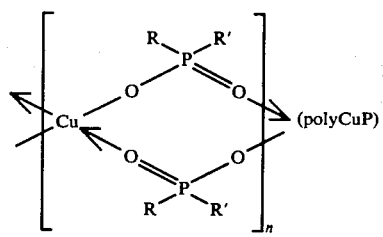 (polyCuP)

wherein R, R' and n have the same meaning as previously defined.

It is believed that the copper atom of the polyCuPP in some way coacts with polyamide and/or ozone to impart ozone fading resistance to polyamide fibers. However, the mechanism by which the copper atom of a polyCuP functions in this capacity is not fully understood.

The present invention is aimed primarily at providing polyamide fibers having improved resistance to ozone fading when dyed with disperse dyes. However, in many instances, when fibers of the present invention are dyed with acid dyes, the resistance of the acid dyed fibers to ozone fading is nearly as good as correspondingly acid dyed fibers from which the polyCuP has been omitted and in some instances the resistance is better.

DETAILED DESCRIPTION OF THE PREFERRED EMBODIMENTS

Polyamide fibers which are particularly prone to ozone fading are the open structured polyamide fibers, such as nylon 6 fibers, wax-containing polyamide fibers (e.g. polyamide fibers containing polyethylene glycol as an additive), and copolyamide fibers. Particularly preferred polyamides which are useful in producing fibers of this description are the fiber-forming melt spinnable polyamides since this class of polyamides has enjoyed considerable commercial success as carpet piling, upholstry fabrics, etc. where ozone fading is a problem. Representative fiber-forming melt spinnable polyamides include nylon 6, nylon 66, nylon 610 and copolymers thereof such as nylon 6/66, nylon 66/610 and nylon 66/6T. The most important fiber-forming melt spinnable polyamides from the standpoint of commercial useage are nylon 6 and nylon 66.

Preferred polyCuPs for use in producing the polyamide fibers of the invention include:

1. poly(copper methylphenylphosphinates)—CuMPP
2. poly(copper ethylphenylphosphinate)—CuEPP
3. poly(copper 2-carboxyethylphenylphosphinate)—CuCEPP
4. poly(copper phenylphosphinate)—CuPP
5. poly(1-hydroxy-3-phospholene-1-oxide-copper), i.e., R and R'=

—CuCP 6. poly(1-hydroxy-2-phospholene-1-oxide-copper), i.e., R and R'=

—Cu2CP 7. poly(copper diphenylphosphinate)—CuDPP
8. The polyCuPP where R and R'=

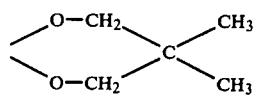

—CuOCP with CuCP, CuMPP, CuCEPP, CuEPP and CuOCP being particularly preferred.

For convenience the concentration of the polyCuP in the polyamide fibers is expressed in terms of copper since copper is common to all the polyCuP.

Usually, polyamide fibers containing on a weight basis sufficient polyCuP to provide as little as about 25 parts per million (ppm) of copper, show improved resistance to ozone fading when compared to the corresponding fiber from which the polyCuP has been omitted. On the other hand, when the copper concentration of the polyCuP-containing polyamide fiber exceeds about 100 ppm, the fiber tends to become noticeably discolored (i.e. off white) due to the presence of the copper. Satisfactory resistance toward ozone fading is obtained with little, if any, discoloration of the polyamide fibers when the fibers contain from about 30 to about 85 ppm of copper added as polyCuP.

A polyCuP may be incorporated into polyamide fibers by techniques commonly employed in the art for incorporating other additives into polyamide fibers. Thus, the polyCuP may be mixed with the polyamide prior to the polyamide being extruded into fiber. Accordingly, when the polyamide fibers are produced by solution spinning, the polyCuP may be mixed with the dope (polymer solution) from which the fibers are shaped. When the polyamide fibers are produced by melt spinning, the polyCuP may be added to the monomers from which the polyamide is produced (e.g. nylon 66 salt solution), to particulate form polymer (e.g. nylon flake) which is subsequently melted and extruded into fiber, or to the molten polyamide just prior to the extrusion thereof into fiber. A mixture of two or more polyCuPs may be used if desired.

In addition to the polyCuP, the fibers of this invention may also contain other additives such as heat stabilizers, delustrants, dye additives or modifiers, viscosity stabilizers, etc.

The following examples are given to further illustrate the invention. In the examples ppm is based on the weight of the polyamide. Also, in the examples fading (ozone fading) was measured by AATCC Test Method 129-1968 which expresses fading as a relative Gray Scale value ranging from 1 to 5 with 5 being the least faded and 1 the most faded. Gray Scale values were obtained on six dyed samples of circular knit tubing prepared from 6 filament or 13 filament drawn yarn. Each of the dyed tubing samples were dyed with one of six dye shades, three disperse dye shades and three acid dye shades and the fading of each was measured after three ozone cycles. The three dye shades were beige, spring green and Kentucky green. For ease of comparison, the Gray Scale values for each of the three shades were averaged for both the disperse dyed and acid dyed fibers. These average Gray Scale values are given in the tables or the examples.

EXAMPLE 1

In this example circular knit tubing samples were prepared from nine nylon 66 (polyhexamethylene adipamide) yarns each composed of six filaments. A polyCuP was added to eight of the yarns and was omitted from the other yarn (control). Each polyCuP, when added, was added to the nylon 66 salt in an amount sufficient to provide a fiber containing either 50 or 85 ppm of Cu.

The fading of each sample was measured by AATCC Test Method 129-1968 in the manner described above. The results of the testing are given in the following table along with the specific polyCuP and amount thereof, expressed in terms of ppm by weight of Cu incorporated into each yarn.

TABLE 1

| Sample | Phosphinate | ppm Cu | dpf | Acid Dyes | Gray Scale Value Disperse Dyes | Average[a] |
|---|---|---|---|---|---|---|
| 1. | CuMPP | 50 | 15 | 3.7 | 3.8 | 3.75 |
| 2. | CuCEPP | 50 | 19 | 3.7 | 3.8 | 3.75 |
| 3. | CuDPP | 50 | 20 | 3.7 | 3.5 | 3.60 |
| 4. | CuEPP | 50 | 18 | 3.4 | 3.5 | 3.45 |
| 5. | CuCP | 50 | 18 | 3.5 | 3.3 | 3.40 |
| 6. | Cu2CP | 50 | 18 | 4.0 | 3.7 | 3.90 |
| 7. | CuOCP | 50 | 19 | 3.5 | 4.0 | 3.75 |
| 8. | CuPP | 50 | 20 | 3.8 | 3.4 | 3.60 |
| 9. | Control 66 | 0 | 21 | 3.6 | 3.2 | 3.40 |

[a] the value in this column is the average of the values in the acid dyes and disperse dyes columns.

The results given in the table show that polyamide fibers of the present invention when dyed with disperse dyes have improved resistance to ozone fading when compared to corresponding fibers from which polyCuP has been omitted (control). In the case of acid dyes, the polyamide fibers of the invention have about the same resistance to ozone fading as the control fibers, and in certain instances an improvement over the control fibers is demonstrated.

EXAMPLE 2

This example demonstrates the effect of the concentration of copper (added as CuEPP) on the resistance of nylon 66 yarn to ozone fading.

In this example knit tubing samples were prepared from five (5) nylon 66 yarns, each containing copper (added as CuEPP) in the amount specified in Table II. The yarns were prepared and tested for color fading in the presence of ozone in the manner described in Example 1. The results of the testing are given in Table II.

TABLE II

| Sample | ppm Cu (Added as CuEPP) | Acid Dyes | Gray Scale Value Disperse Dyes | Average |
|---|---|---|---|---|
| 1. | 0 | 3.6 | 3.2 | 3.4 |
| 2. | 30 | 3.3 | 3.5 | 3.4 |
| 3. | 35 | 3.5 | 3.3 | 3.4 |
| 4. | 50 | 3.4 | 3.5 | 3.45 |
| 5. | 85 | 3.5 | 3.5 | 3.45 |

The results of this Example shows than an improvement in the resistance to ozone fading is imparted to polyamide fibers dyed with disperse dyes when as little as 30 ppm Cu added as CuEPP is incorporated into the fibers.

EXAMPLE 3

This example illustrates the invention with respect to copolyamides.

In this example two yarns were made. One yarn contained 50 ppm Cu, added as CuMPP, where as the CuMPP was omitted from the other yarn. The yarns were prepared in the same manner as the yarns of Example 1 except that 10 mole % of the nylon 66 salt was replaced with an equivalent amount of a salt prepared from equimolar amounts of hexamethylene diamine and bis(2-carboxyethylmethylphosphine oxide). Preparation of copolyamides of this type is described in U.S. Pat. No. 4,032,517. Knit tube samples were prepared from each yarn and tested as described in Example 1. The results of the testing is given in Table III.

TABLE III

| Sample | Phosphinate | ppm Cu | dpf | Acid Dyes | Gray Scale Value Disperse Dyes | Average |
|---|---|---|---|---|---|---|
| 1. | none | 0 | 18 | 2.7 | 1.7 | 2.2 |
| 2 | CuMPP | 50 | 20 | 2.2 | 2.2 | 2.2 |

The results of this Example show that copolyamide fibers containing a polyCupp when dyed with disperse dyes have improved resistance to ozone fading.

EXAMPLE 4

This example illustrates the invention with respect to wax-containing polyamides.

In this example three wax-containing nylon 66 yarns each composed of 6 filaments were prepared. Each yarn contained dispersed therein 2.5% by weight, based on the weight of nylon 66, of hydrogenated polyethoxylated castor oil, as the wax, and either 0,50 or 85 ppm of CuEPP. Knit tubing samples were prepared from each yarn, dyed and tested in the manner described in Example 1. The results of testing are given below in Table IV.

TABLE IV

| Sample | PolyCuP | ppm Cu | dpf | Acid Dyes | Gray Scale Values Disperse Dyes | Average |
|---|---|---|---|---|---|---|
| 1. | — | 0 | 21 | 3.3 | 3.0 | 3.15 |
| 2. | CuEPP | 50 | 18 | 3.6 | 3.3 | 3.45 |
| 3. | CuEPP | 85 | 16 | 3.7 | 3.5 | 3.60 |

The results of this example show that polyamide fibers of the invention which contain a wax and are dyed with either acid or disperse dyes have improved resistance to ozone fading when compared to corresponding fibers from which the polyCuP is omitted.

This example illustrates that the advantages of the invention are also obtained with polyamide fibers having a low dpf (denier per filament).

In this example two nylon 66 six dpf yarns each composed of 13 filaments. One yarn contained 50 ppm of Cu, added as CuEPP. CuEPP was omitted from the other yarn. Knit tube samples were prepared from each yarn, dyed and tested in the manner described in Example 1. The results of the testing are given in Table V.

TABLE V

| Sample | PolyCuP | ppm Cu | Acid Dyes | Gray Scale Value Disperse Dyes | Average |
|---|---|---|---|---|---|
| 1. | — | 0 | 3.3 | 3.0 | 3.15 |
| 2. | CuEPP | 50 | 3.3 | 3.7 | 3.50 |

EXAMPLE 6

This example illustrates nylon 6 fibers of the invention.

In this example, two nylon 6 yarns each composed of 6 filaments and having a yarn denier of about 100 were prepared. One yarn contained CuEPP. The other yarn contained no polyCuP. Knit tubing samples were prepared from each yarn, dyed and tested in the manner described in Example 1. The results of the testing show that nylon 6 fibers containing a polyCuP have improved resistance to ozone fading. The results are given below in Table VI.

TABLE VI

| Sample | PolyCuP | ppm Cu | Acid Dyes | Gray Scale Value Disperse Dyes |
|---|---|---|---|---|
| 1. | — | 0 | 3.3 | 2.8 |
| 2. | CuEPP | 50 | 3.5 | 3.3 |

EXAMPLE 7

In this example polyNiPP and polyMnPP were evaluated as antiozonants.

Nylon 66 yarns containing either NiEPP, NiMPP, or MnMPP at concentrations sufficient to provide from 25 to 50 ppm of Ni or Mn on weight of polyamide were prepared along with yarns from which a phosphinate was omitted (controls). The yarns were made into knit tubing samples and tested for their ozone fading resistance when dyed with disperse dyes in the manner described in Example 1. Although the yarns containing nickel showed an improvement in resistance to ozone fading when compared to control yarns, they were severely discolored and therefore unacceptable. On the other hand, the yarns containing manganese were not discolored, but these yarns showed no improvement in ozone fading resistance over control yarns.

We claim:

1. A polyamide fiber containing as an antiozonant one or more poly(copper phosphinates) of the formula

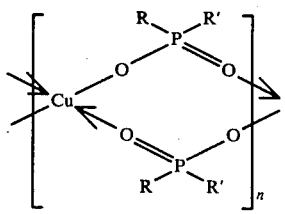

where R is —H, —CH$_3$, —C$_2$H$_5$, —CH$_2$CH$_2$CO$_2$H or

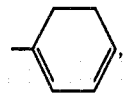

R' is

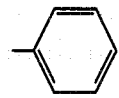

and n is a whole number greater than 1, with the proviso that R and R' may be joined to form the radical

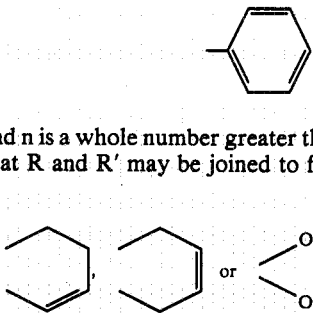

wherein said phosphinate is present in an amount sufficient to provide from about 25 to about 100 parts per million of copper, based on the weight of the polyamide.

2. The fiber of claim 1 wherein R' is

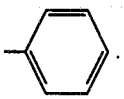

3. The fiber of claim 2 wherein R is —CH$_3$.
4. The fiber of claim 2 wherein R is —CH$_2$CH$_2$CO$_2$H.
5. The fiber of claim 2 wherein R is —C$_2$H$_5$.
6. The fiber of claim 1 wherein R and R' are joined to form with the phosphorus atom radicals of the structure.

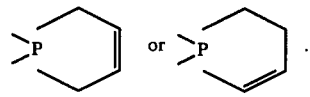

7. The fiber of claim 1 wherein R and R' are joined to form with the phosphorus atoms radicals of the structure

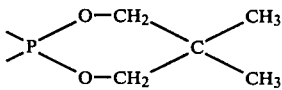

8. The fiber of claim 1 wherein the polyamide is polycaprolactam.
9. The fiber of claim 1 wherein the polyamide is polyhexamethylene adipamide.
10. The fiber of claim 1, wherein said phosphinate is present in an amount sufficient to provide from 30 to 85 parts per million of copper, based on the weight of the polyamide.

* * * * *